US011885528B2

(12) United States Patent
Kim et al.

(10) Patent No.: US 11,885,528 B2
(45) Date of Patent: Jan. 30, 2024

(54) AIR PURIFIER WITH VERTICAL ROTATION AND HORIZONTAL ROTATION

(71) Applicant: COWAY CO., LTD., Gongju-si (KR)

(72) Inventors: Dong Wook Kim, Seoul (KR); Sung Jae Lee, Seoul (KR); Ki Chul Kim, Seoul (KR); Young Jae Lee, Seoul (KR); Kyu Han Kim, Seoul (KR); Jin Kyu Joung, Seoul (KR)

(73) Assignee: COWAY CO., LTD., Gongju-si (KR)

(*) Notice: Subject to any disclaimer, the term of this patent is extended or adjusted under 35 U.S.C. 154(b) by 670 days.

(21) Appl. No.: 17/043,390

(22) PCT Filed: Mar. 19, 2019

(86) PCT No.: PCT/KR2019/003187
§ 371 (c)(1),
(2) Date: Sep. 29, 2020

(87) PCT Pub. No.: WO2019/190112
PCT Pub. Date: Oct. 3, 2019

(65) Prior Publication Data
US 2021/0108809 A1   Apr. 15, 2021

(30) Foreign Application Priority Data
Mar. 30, 2018 (KR) .................. 10-2018-0037246

(51) Int. Cl.
*F24F 8/80* (2021.01)
*B01D 46/00* (2022.01)
*B01D 46/42* (2006.01)

(52) U.S. Cl.
CPC ............ *F24F 8/80* (2021.01); *B01D 46/0002* (2013.01); *B01D 46/0049* (2013.01); *B01D 46/4245* (2013.01); *B01D 2273/30* (2013.01)

(58) Field of Classification Search
CPC ... F24F 8/80; B01D 46/0002; B01D 46/0049; B01D 46/4245; B01D 2273/30
USPC .......................................................... 55/536
See application file for complete search history.

(56) References Cited

U.S. PATENT DOCUMENTS

| 9,821,259 | B2 | 11/2017 | Bae et al. | |
| 9,821,262 | B2 | 11/2017 | Park et al. | |
| 9,827,523 | B2 | 11/2017 | Park et al. | |
| 9,914,082 | B2 | 3/2018 | Park et al. | |
| 9,943,794 | B2 | 4/2018 | Jung et al. | |
| 9,950,289 | B2 | 4/2018 | Jung et al. | |
| 2014/0020561 | A1* | 1/2014 | Aery ............... | B01D 46/60 55/467 |

(Continued)

FOREIGN PATENT DOCUMENTS

| CN | 105444288 A | * | 3/2016 | ............... B60H 3/00 |
| JP | 2014-507579 A | | 3/2014 | |

(Continued)

OTHER PUBLICATIONS

International Search Report dated Jul. 9, 2019 in PCT/KR2019/003187 filed Mar. 19, 2019 4 pages.

*Primary Examiner* — Robert A Hopkins
(74) *Attorney, Agent, or Firm* — Oblon, McClelland, Maier & Neustadt, L.L.P.

(57) ABSTRACT

The present invention relates to an air purifier in which vertical rotation and horizontal rotation are performed simultaneously and independently and which has a stable structure.

18 Claims, 13 Drawing Sheets

(56) References Cited

U.S. PATENT DOCUMENTS

| | | | |
|---|---|---|---|
| 2017/0246570 A1 | 8/2017 | Park et al. | |
| 2017/0246572 A1 | 8/2017 | Park et al. | |
| 2017/0246576 A1 | 8/2017 | Jung et al. | |
| 2017/0246577 A1 | 8/2017 | Jung et al. | |
| 2017/0246578 A1 | 8/2017 | Jung et al. | |
| 2017/0246579 A1 | 8/2017 | Mun et al. | |
| 2017/0246580 A1 | 8/2017 | Bae et al. | |
| 2017/0246581 A1 | 8/2017 | Jung et al. | |
| 2017/0246582 A1 | 8/2017 | Park et al. | |
| 2017/0248153 A1* | 8/2017 | Park | A61L 9/22 |
| 2017/0248339 A1 | 8/2017 | Mun et al. | |
| 2017/0320002 A1 | 11/2017 | Bae et al. | |
| 2017/0320003 A1 | 11/2017 | Bae et al. | |
| 2017/0321715 A1 | 11/2017 | Park et al. | |
| 2017/0321716 A1 | 11/2017 | Park et al. | |
| 2017/0321717 A1 | 11/2017 | Park et al. | |
| 2017/0321718 A1 | 11/2017 | Park et al. | |
| 2017/0321719 A1 | 11/2017 | Park et al. | |
| 2017/0321720 A1 | 11/2017 | Park et al. | |
| 2017/0326490 A1 | 11/2017 | Jung et al. | |
| 2017/0326491 A1 | 11/2017 | Jung et al. | |
| 2018/0207568 A1 | 7/2018 | Jung et al. | |

FOREIGN PATENT DOCUMENTS

| | | |
|---|---|---|
| KR | 10-0197719 B1 | 6/1999 |
| KR | 10-0601586 B1 | 7/2006 |
| KR | 10-2008-0013397 A | 2/2008 |
| KR | 10-2014-0096971 A | 8/2014 |
| KR | 10-1500506 B1 | 3/2015 |
| KR | 10-2018-0000121 A | 1/2018 |

\* cited by examiner

AIR PURIFIER WITH VERTICAL ROTATION AND HORIZONTAL ROTATION

BACKGROUND OF THE INVENTION

1. Field of the Invention

The present invention relates to an air purifier in which vertical rotation and horizontal rotation may be performed simultaneously and independently and which has a stable structure.

2. Description of the Related Art

An air purifier includes a plurality of filter units and purifies inhaled air and then discharges it to the outside. Since air purification is performed from a direction in which a discharge portion from which purified air is discharged is directed, many air purifiers adopt a configuration capable of adjusting the direction of the discharge portion.

Traditional air purifiers include a single housing, with a discharge portion located on the upper surface of the housing and a variable grill provided on the outer surface of the discharge portion. By rotating a plurality of plate members constituting the variable grill manually or automatically, it was possible to change the discharge direction of about 60 degrees back and forth based on the upper side. In some cases, a grill that rotates left and right is further provided inside the variable grill.

Adjusting the direction of the discharge portion in this manner has a problem in that a vertical movement width is limited, it is difficult to visually inform the current discharge direction to a consumer, and that foreign substances are caught between the grills, causing an error in operation.

To solve this problem, as an air purifier in which the housing is divided into two portions (i.e., a head portion including the discharge portion and a body portion excluding the head portion), an air purifier by using a method of realizing a substantially free discharge direction by rotating the head portion has been proposed.

Korean Application Publication 10-2018-0000121 discloses an air purifier, which is separated by a blowing device at the bottom and a flow conversion device at the top. The flow conversion device can freely change the discharge direction of the purified air through the flow conversion device because it is capable of performing vertical and horizontal movements relative to the blowing device.

However, in the above prior art, vertical movement and horizontal movement are completely free and are not independently guaranteed. A discharge guide device is mounted on the upper part of the blowing device at the bottom, and the flow conversion device is mounted on the top of the discharge guide device. When horizontal rotation is performed, the discharge guide device and the flow conversion device are rotated together, and when vertical rotation is performed, only the flow conversion device is rotated. The flow conversion device is configured to be mounted on the discharge guide device for vertical rotation, and the combination thereof is not sufficiently stable. Accordingly, there is a problem in that the flow conversion device above the discharge guide device is shaken during horizontal rotation, so that a stable position cannot be maintained.

In addition, a gear for vertical rotation of the flow conversion device is provided at the bottom of the rear side of the flow conversion device. When the flow conversion device is rotated, the gear is exposed to the outside, and there is a high risk of accidents such as foreign substances or fingers of infants being trapped.

In addition, all configurations for purifying air are provided in the blowing device at the bottom. That is, the flow conversion device performs only a type of grill function of simply changing the flow direction of air. Accordingly, the blowing device and the flow conversion device are required to be rotated vertically and horizontally and to allow mutual air flow, resulting in a large product and a complex structure.

(Patent Document 1) KR 10-2018-0000121 A
(Patent Document 2) KR 10-0601586 B
(Patent Document 3) JP 2014-507579 A

SUMMARY OF THE INVENTION

The present invention is devised to solve the above problems.

The present invention provides an air purifier in which a head portion from which air is discharged and a body portion including other mechanical parts are separately provided and the head portion may be rotated vertically and horizontally.

However, unlike the prior art, the present invention also provides an air purifier in which all of air purifying parts including a filter are provided inside a head portion and the structures of the head portion and a body portion are simplified and the size thereof is compacted.

Unlike the prior art, the present invention also provides an air purifier in which vertical rotation and horizontal rotation of a head portion may be stably and independently performed and simultaneously implemented.

According to an embodiment of the present invention to solve the problems above, there is provided an air purifier including a body portion (300), a neck portion (200) located at an upper part of the body portion (300) and combined with the body portion (300) to be rotatable horizontally with respect to the body portion (300), and a head portion (100), which is located at an upper part of the neck portion (200), into which part of the neck portion (200) is combined to be rotatable vertically with respect to the neck portion (200) and which includes a fan assembly (120) and filters and discharges inhaled air.

Additionally, the neck portion (200) may include a neck housing (210), a head frame (220) located inside the head portion (100) and being part combined with an inside of the head portion (100), and a frame body (230) located inside the neck housing (210), wherein the head portion (100) further includes a head lower housing (140) which constitutes a lower outer surface of the head portion (100) and in which a guide opening (144) is located, and the head frame (220) passes through the guide opening (144) and is combined with the frame body (230).

Additionally, frame body insertion members (222) that protrude downward and are inserted into the frame body (230) may be located at one side of the head frame (220), and the frame body insertion members (222) may pass through the guide opening (144).

Additionally, vertical rotation of the head portion (100) may be limited by a length of the guide opening (144) by the frame body insertion members (222).

Additionally, an opposite part of the frame body insertion members (222) of the head frame (220) may be a curved surface.

Additionally, the neck portion (200) may further include a vertical rotation member (240), the frame body (230) may include a gear penetration portion (234), and the vertical rotation member (240) may pass through the gear penetration portion (234) and may be fastened to the head lower housing (140).

Additionally, when the vertical rotation member (240) operates, in a state in which the head frame (220) is fixed, the head lower housing (140) and the fan assembly (120) combined therewith may be rotated vertically.

Additionally, the neck housing (210) may further include a head vertical rotation guide portion (213) extending radially outward from an upper end thereof, and a vertical rotation support portion (211) extending upward from part of the head vertical rotation guide portion (213).

Additionally, the head portion (100) may have a spherical shape, and a curvature of the vertical rotation support portion (211) may be the same as a curvature of part of the head portion (100) corresponding to the vertical rotation support portion (211).

Additionally, the vertical rotation support portion (211) may be located to cover the guide opening (144) with respect to the outside.

Additionally, a roller (212) may be located at an upper inner end of the vertical rotation support portion (211) and may assist vertical rotation of the head portion (100).

Additionally, a plurality of rollers (232) may be located above the frame body (230), may protrude from an upper surface of the frame body (230), and may contact with the head lower housing (140).

Additionally, the head portion (100) may have a spherical shape, and a curvature of the upper surface of the frame body (230) may be the same as a curvature of part of the head portion (100) corresponding to the head lower housing (140).

Additionally, the body portion (300) may include a body housing (330) on which the neck housing (210) is seated, and an inner body (360) fixed to an inside of the body housing (330).

Additionally, the neck housing (210) may be seated on the body housing (330) to be rotatable horizontally.

Additionally, a horizontal rotation gear (341) may be combined with the neck housing (210), and the body portion (300) may further include a horizontal rotation motor (342) combined with the inner body (360) to provide power fastened to the horizontal rotation gear (341).

Additionally, the neck housing (210) may include a head vertical rotation guide portion (213) extending radially outward from an upper end thereof, and the body housing (330) may include a neck horizontal rotation guide portion (335) located radially at an upper end thereof, and the head vertical rotation guide portion (213) may be seated on the neck horizontal rotation guide portion (335).

Additionally, the neck horizontal rotation guide portion (335) and the head vertical rotation guide portion (213) may be tapered radially inward.

Additionally, a base (400) may be located at a bottom end of the body portion (300), the inner body (360) may be combined with the base (400), and a plurality of wheels (410) may be located on a bottom surface of the base (400).

Additionally, when the head portion (100) is rotated vertically, the head portion (100) may be rotated up and down, and the neck portion (200) and the body portion (300) may be fixed, and when the head portion (100) is rotated horizontally, the head portion (100) and the neck portion (200) may be rotated left and right, and the body portion (300) may be fixed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
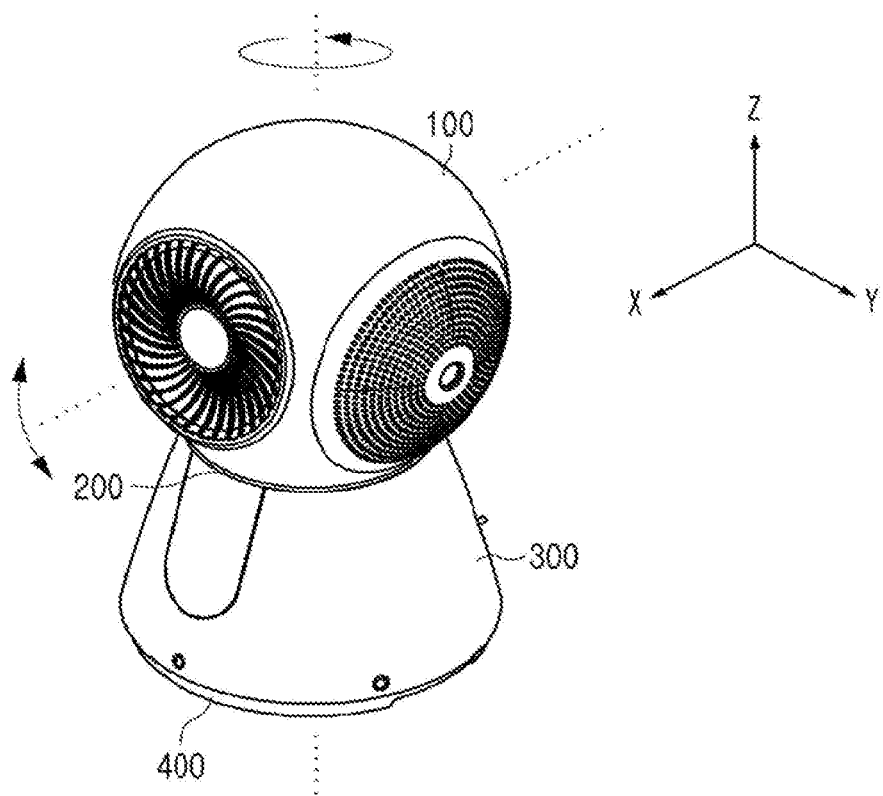
FIG. 1 is a perspective view of an air purifier according to an embodiment from the upper front.

Hereinafter, the air purifier according to the present invention will be described with reference to the drawings.

For explanation, terms such as front (X-axis), rear (−X-axis), right (Y-axis), left (−Y-axis), top (Z-axis), and bottom (−Z-axis) of the air purifier are used, and a coordinate system is shown in the drawings. However, this is for illustrative purposes only, and embodiments are not limited to corresponding directions. For example, in the drawings, the air is inhaled from the left and the right, and the air is discharged from the front, but the direction of the air can be changed as much as possible.

In addition, hereinafter, rotation of a head portion 100 in a horizontal direction (i.e., horizontal rotation) and rotation of the head portion 100 in a vertical direction (i.e., vertical rotation) are described separately. However, it should be noted that these rotation operations can be performed individually or in combination. In addition, the horizontal direction (i.e., the X-Y plane) and the vertical direction (i.e., the Z-X plane) are merely direction settings for explanation, and embodiments are not limited to these directions.

Description of Air Purifier

First, the air purifier according to the present invention will be described with reference to FIGS. 1 to 3.

Figure 2:
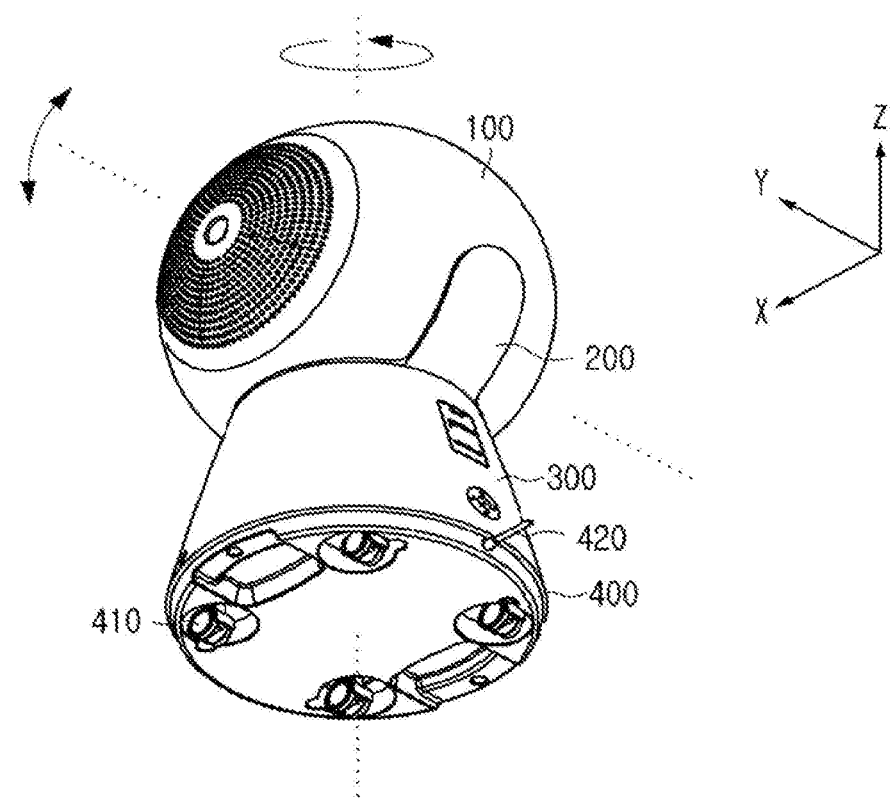
FIG. 2 is a perspective view of the air purifier according to an embodiment from the lower rear.
Figure 3:
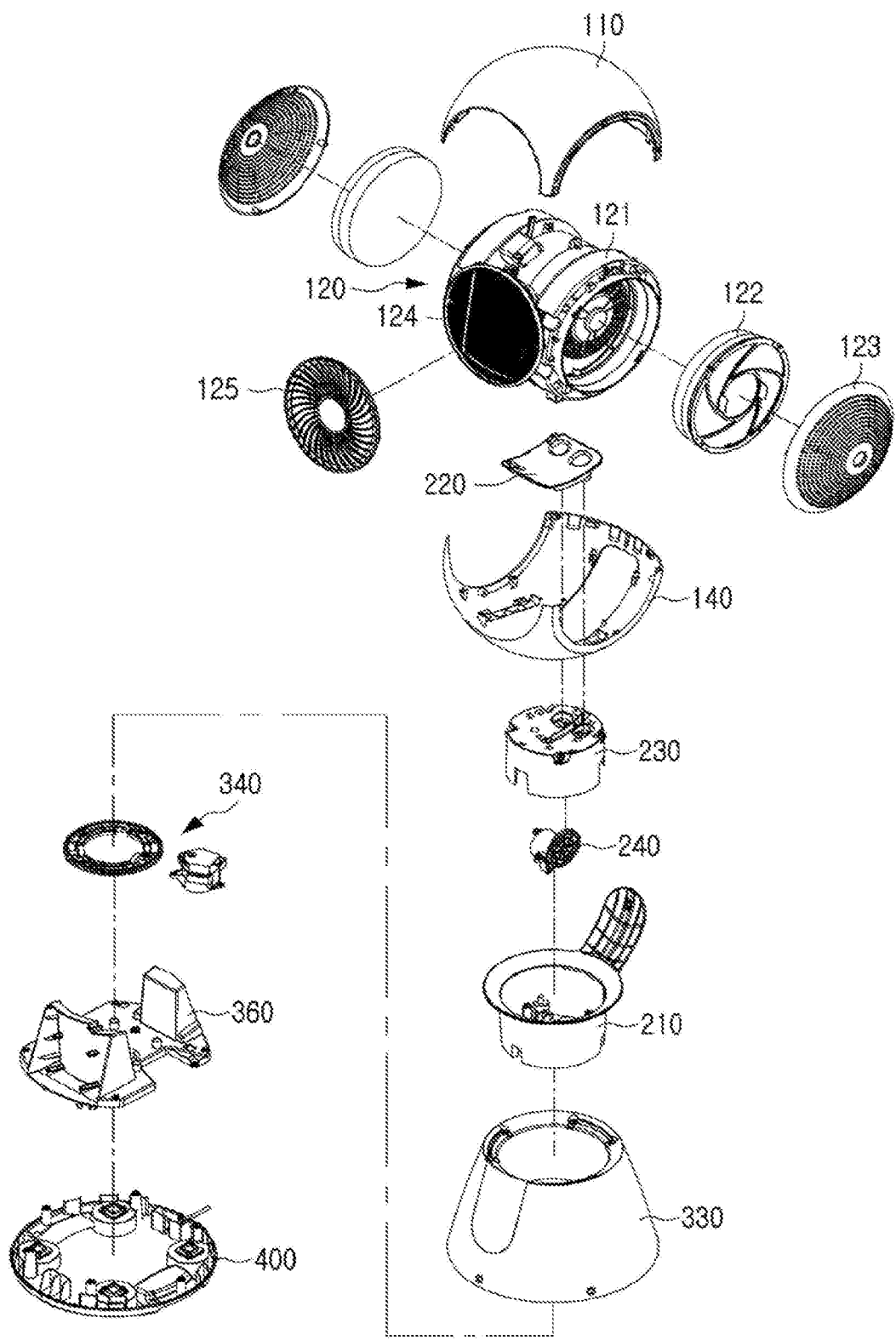
FIG. 3 is an exploded perspective view of the air purifier according to an embodiment.

As shown in FIGS. 1 and 2, the air purifier according to the present invention includes a head portion 100, a neck portion 200, a body portion 300, and a base 400.

The head portion 100 that performs an air purifying function may be rotated horizontally and vertically. Accordingly, a user may discharge air in various directions. Horizontal rotation and vertical rotation may be simultaneously or separately performed. In the air purifier according to the present invention, it is characterized that horizontal rotation and vertical rotation are stably and independently performed so as not to affect each other.

When the head portion 100 is rotated vertically, the head portion 100 is rotated up and down, and the neck portion 200 and the body portion 300 are fixed. When the head portion 100 is rotated horizontally, the head portion 100 and the neck portion 200 are rotated left and right, and the body portion 300 is fixed. A detailed rotation method will be described later.

The head portion 100 includes a head upper housing 110, a fan assembly 120, and a head lower housing 140, inhales external air, purifies the external air by a filter 122 and then discharges the air, thereby performing the air purifying function.

To this end, the fan assembly 120 includes air inhalation grills 123, which are located at the left and right, respectively, the filter 122 located inside the air inhalation grills 123, a fan 121, a discharge portion 124 located in front of the fan 121, and a discharge grill 125.

As shown in the drawings, in order to inhale air from the left and right sides individually or simultaneously, the fan 121 may be a double-sided fan but may be modified to inhale air only from one of the left and right sides. In this case, the fan 121 may be a single-sided fan.

The filter 122 may include a pre-filter, a HEPA filter, or the like, but is not limited to the number and type of filters included.

The neck portion 200 is located at the upper part of the body portion 300 and at the lower part of the head portion 100. The neck portion 200 is configured in such a way that, when the head portion 100 is rotated vertically, the neck portion 200 is not rotated but when the head portion 100 is rotated horizontally, the head portion 100 and the neck portion 200 are rotated together.

The neck portion 200 includes a neck housing 210, a head frame 220 located inside the head portion 100, a frame body 230 located inside the neck housing 210 and combined with the head frame 220, and a vertical rotation member 240 for rotating the head portion 100 vertically. A detailed combination and operating principle will be described later.

The body portion 300 includes a body housing 330 that protects internal parts, a horizontal rotation member 340 for rotating the head portion 100 and the neck portion 200 horizontally, and an inner body 360 with which the internal parts are combined and which is fixed to the base 400.

Figure 8:
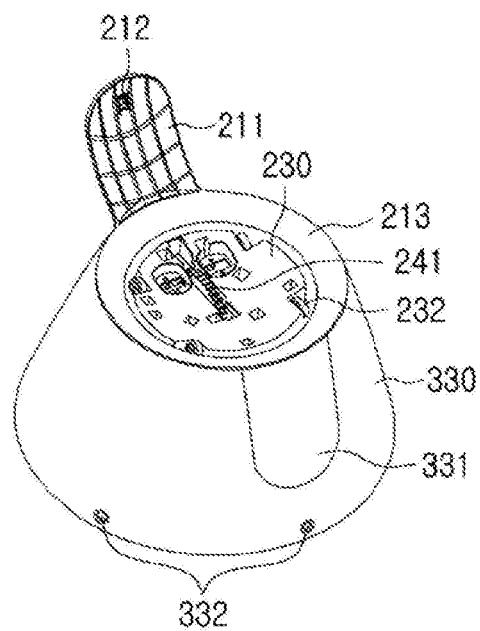
FIG. 8 is a perspective view illustrating the neck portion and the body portion of the air purifier according to an embodiment.

The body housing 330 has a hollow portion 339 in the middle thereof so that the neck housing 210 may be inserted into the body housing 330 through the hollow portion 339 to be rotated horizontally. In addition, a display 331 that shows an operating state and receives a signal from the user, and a plurality of motion sensors 332 that detect nearby user's movement are located in front of the body housing 330 (see FIG. 8).

The base 400 forms a bottom surface of the air purifier. A plurality of wheels 410 for movement and a cable 420 for receiving power from the outside are provided.

Vertical Rotation of Head Portion 100

Vertical rotation of the head portion 100 will be described with reference to FIGS. 4 and 5.

Figure 4:
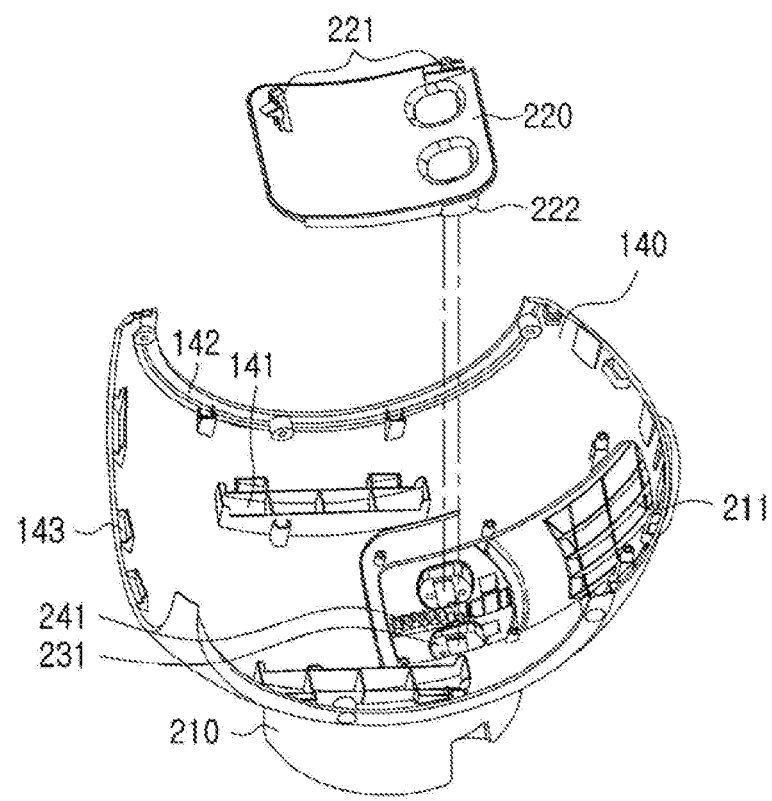
FIG. 4 is an exploded perspective view illustrating part of a head portion and a neck portion of the air purifier according to an embodiment.
Figure 5:
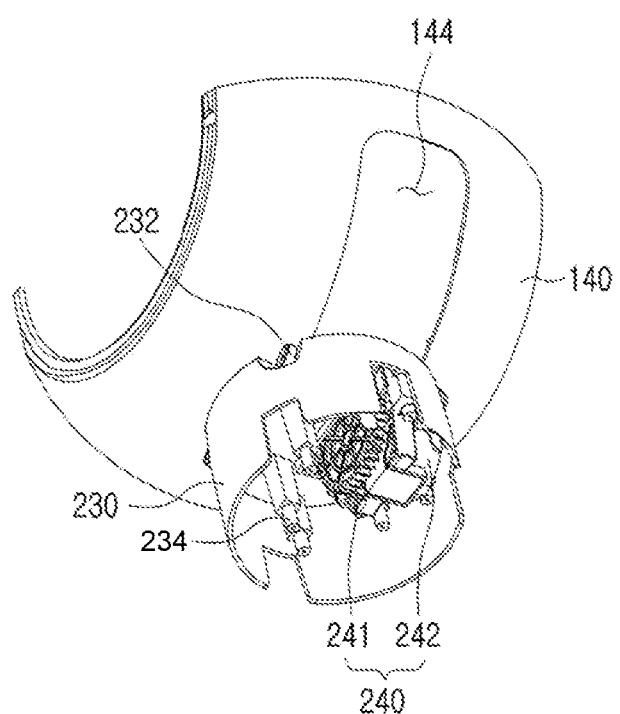
FIG. 5 is a perspective view illustrating part of the head portion and the neck portion of the air purifier according to an embodiment from a downward direction, wherein illustration of a neck housing is omitted for explanation.

FIGS. 4 and 5 illustrate the head portion 100 and the neck portion 200. For explanation, illustration of the head upper portion 110 of the head portion 100 and the fan assembly 120 is omitted. In FIG. 5, illustration of the neck housing 20 is further omitted for explanation.

The head lower housing 140 is a housing that surrounds the lower part, that is, less than half from the outside. When the head portion 100 has a spherical shape, it may have a hemispherical shape.

The head upper housing 110 and the fan assembly 120 are combined with and fixed to the head lower housing 140. That is, when the head lower housing 140 is rotated vertically, the entire head portion 100 is rotated vertically. For combination and fixing, a fan combination portion 141 with which the fan 121 is combined, a filter combination portion 142 with which the filter 122 is combined, and a discharge grill combination portion 143 with which the discharge grill 125 is combined are located above an inner surface of the head lower housing 140.

As shown in FIG. 5, a guide opening 144 is located in an arc shape toward the rear in the head lower housing 140. The guide opening 144 is a passage through which the head frame 220 passes when the head frame 220 is combined with the frame body 230, and guides rotation when the head lower housing 140 is rotated vertically. The guide opening 144 is covered with a vertical rotation support portion 211 that will be described later, and is not visible to the outside.

Figure 9:
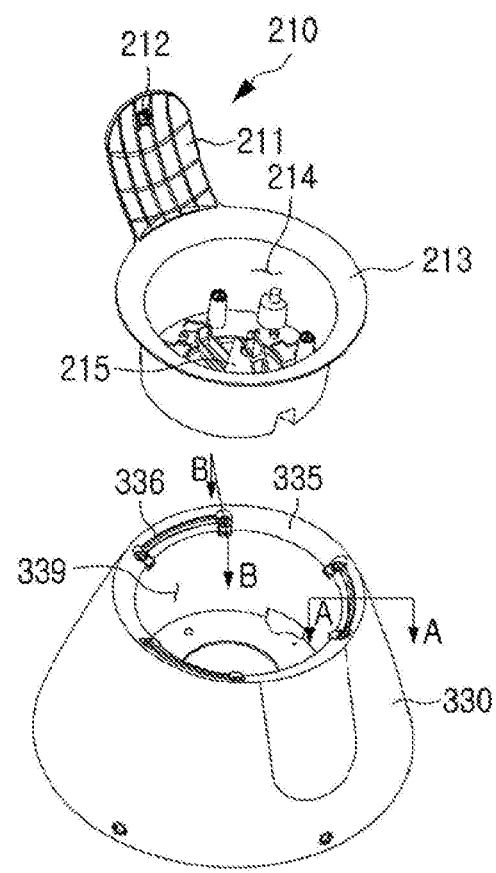
FIG. 9 is an exploded perspective view illustrating the neck portion and the body portion of the air purifier according to an embodiment.

The neck portion 200 includes a neck housing 210 (see FIG. 9). The neck housing 210 is inserted into the hollow portion 339 in the middle of the inner side of the body housing 330 as will be described later; is rotated horizontally together with the head portion 100; is fixed when the head portion 100 is rotated vertically; and guides the head portion 100.

The neck housing 210 includes a head vertical rotation guide portion 213 (see FIG. 7) that extends radially outward from an upper end thereof, a vertical rotation support portion 211 that extends upward from one part of the head vertical rotation guide portion 213, a roller 212 that is located at an upper inner end of the vertical rotation support portion 211 and assists vertical rotation of the head portion 100, and an inner space portion 214 (see FIG. 9) that is the center space of the head vertical rotation guide portion 213.

The head portion 100 is seated on the head vertical rotation guide portion 213, and the head vertical rotation guide portion 213 guides the head portion 100 when the head portion 100 is rotated vertically. To this end, when the head portion 100 has a spherical shape, the head portion 100 may have a circular shape tapered radially inward to correspond to the curvature thereof. However, a plurality of rollers 232 are located above the frame body 230 so that the head portion 100 does not directly contact the head vertical rotation guide portion 213.

The vertical rotation support portion 211 covers the guide opening 144 and guides vertical rotation of the head portion 100. When the head portion 100 has a spherical shape, the curvature of the vertical rotation support portion 211 may be the same as the curvature of a part of the head portion 100 corresponding to the vertical rotation support portion 211. The head portion 100 does not directly contact the vertical rotation support portion 211 by the roller 212 located at the vertical rotation support portion 211.

The neck portion 200 further includes a head frame 220. The head frame 220 is located inside the head portion 100, i.e., between the head upper housing 110 and the head lower housing 140; passes through the guide opening 144; and is combined with the frame body 230 of the neck portion 220. Thus, when the head portion 100 is rotated vertically, the head frame 220 is fixed.

The head frame 220 passes through the guide opening 144 and is combined with the frame body 230. In other words, a pair of frame body insertion members 222 is located on the bottom surface of the head frame 220, and the pair of frame body insertion members 222 passes through the guide opening 144 and are inserted into a head frame insertion portion 231 of the frame body 230 and thus are combined therewith.

Accordingly, when the head lower housing 140 is rotated vertically, a vertical rotation radius is limited by the length of the guide opening 144. Rotation of the head portion 100 is limited from a position where the frame body insertion members 222 are caught on lower edges of the guide opening 144 to a position where the frame body insertion members 222 are caught on upper edges of the guide opening 144.

The entire shape of the head frame 220 may be a curved surface for guiding the head lower frame 140. That is, an opposite part of the frame body insertion members 222 of the head frame 220 is a curved surface so that, when the head portion 100 is rotated, the head frame 220 maintains the correct position of the head portion 100.

A pair of reed switches 221 is located on the head frame 220, and the pair of reed switches 221 may check the rotation state of the head portion 100 and may apply relevant information to a microcomputer.

The frame body 230 is inserted into the inner space portion 214 of the neck housing 210 and is combined with the head frame 220, as described above. The plurality of rollers 232 are located above the frame body 230, protrude from an upper surface of the frame body 230, and contact the head lower housing 140. In addition, when the head portion 100 has a spherical shape, preferably, the curvature of the upper surface of the frame body 230 is the same as the curvature of a portion of the head portion 100 corresponding to the head lower housing 140.

The vertical rotation member 240 is located inside the frame body 230 and is fastened to the head lower housing 140. Specifically, the vertical rotation member 240 includes a vertical rotation gear 241 and a vertical rotation motor 242 that provided a rotation power to the vertical rotation gear 241. The vertical rotation gear 241 passes through a gear penetration portion 234 of the frame body 230 and is fastened to the head lower housing 140. The vertical rotation motor 242 may be a step motor.

A vertical rotation method will be described in detail.

The vertical rotation gear 241 is rotated by the vertical rotation motor 242. When the vertical rotation gear 241 is rotated, the head lower housing 140 fastened to the vertical rotation gear 241 is rotated so that the head portion 100 may be rotated vertically.

When the head portion 100 is rotated vertically, the bottom surface of the head portion 100 contacts the plurality of rollers 232 of the frame body 230, and the rear surface of the head portion 100 contacts the roller 212 of the neck housing 210 so that smooth rotation may be performed without abrasion of the head portion 100 or the neck portion 200.

When the head portion 100 is rotated vertically, the head frame 220 is combined with the frame body 230 and is maintained without being rotated. Accordingly, the curved surface of the head frame 220 guides the inner surface of the head lower housing 140 so as to maintain the correct position of the head portion 100.

A range, in which the head portion 100 is rotated vertically, is determined according to the length of the guide opening 144. That is, the head portion 100 is rotated vertically only between positions where the frame body insertion member 222 of the head frame 220 are caught between upper and lower edges of the guide opening 144.

A degree of vertical rotation of the head portion 100 is checked by the reed switches 221 of the head frame 220.

Horizontal Rotation of Head Portion 100

Horizontal rotation of the head portion 100 will be described with reference to FIGS. 6 to 10.

Horizontal rotation of the head portion 100 is implemented by rotation of the neck portion 200. That is, since the head frame 220 and the frame body 230 of the neck portion 200 are combined with each other with the head lower housing 140 therebetween, so that, when the neck portion 200 is rotated, the head portion 100 is rotated together. Thus, horizontal rotation of the head portion 100 will be understood by describing a horizontal rotation method of the neck portion 200. Accordingly, illustration of the head portion 100 is omitted in FIGS. 6 and 10.

The body portion 300 is fixed when the head portion 100 is rotated vertically or horizontally.

The body portion 300 includes a body housing 330 (see FIG. 9) on which the neck housing 210 is seated to be rotatable horizontally, a horizontal rotation member 340 for rotating the neck portion 200 horizontally, and an inner body 360 fixed to the inside of the body housing 330.

Figure 6:
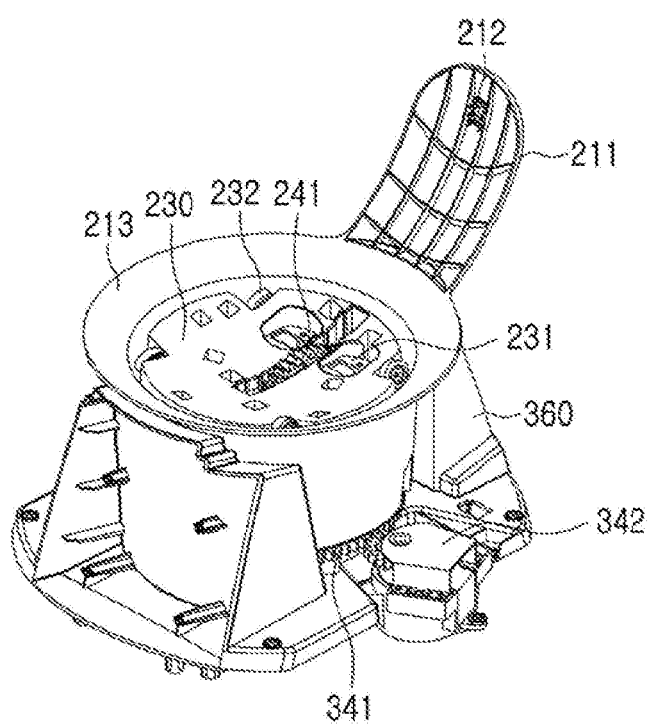
FIG. 6 is a perspective view illustrating the neck portion and part of a body portion of the air purifier according to an embodiment.
Figure 7:
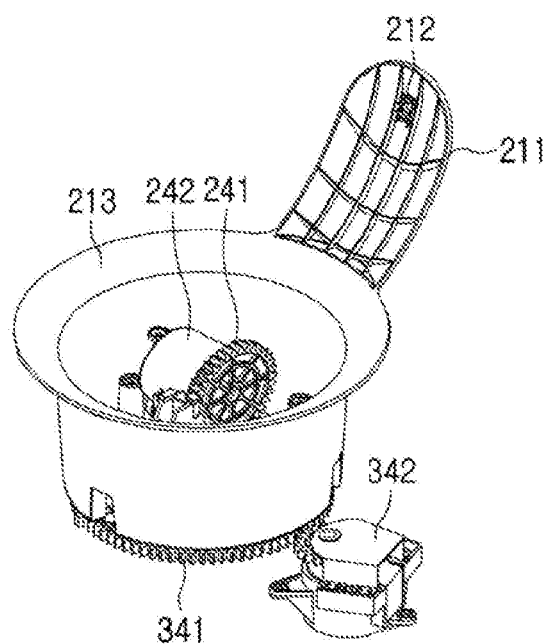
FIG. 7 is a perspective view illustrating part of the neck portion and a horizontal rotation member of the air purifier according to an embodiment.

As shown in FIGS. 6 and 7, the horizontal rotation member 340 includes a horizontal rotation gear 341 that is combined with the bottom surface of the neck housing 210 and rotates together, and a horizontal rotation motor 342 which is fastened to be engaged with the horizontal rotation gear 341 to provide power and which is combined with the inner body 360.

As shown in FIG. 9, the neck housing 210 is seated on the body housing 330, and when the horizontal rotation gear 341 that receives power from the horizontal rotation motor 342 is rotated, the neck housing 210 is rotated while the head portion 100 is rotated.

The body housing 330 includes a neck horizontal rotation guide portion 335 located radially at an upper end thereof. The neck horizontal rotation guide portion 335 and the head vertical rotation guide portion 213 have substantially similar sizes and shapes so that the head vertical rotation guide portion 213 may be seated on the neck horizontal rotation guide portion 335.

When the head portion 100 has a spherical shape, both of the neck horizontal rotation guide portion 335 and the head vertical rotation guide portion 213 have a circular shape in which they are connected to each other radially in all directions, are tapered radially inward so that the head portion 100 may be seated safely.

However, a plurality of rails 336 are located on the neck horizontal rotation guide portion 335, and the head vertical rotation guide portion 213 does not contact directly the neck horizontal rotation guide portion 335 but is spaced from the neck horizontal rotation guide portion 335 by the length at which the plurality of rails 336 protrude. A detailed description thereof will be provided later.

Reed switches (not shown) are located in the inner center of the body housing 330, checks a rotation state of the neck portion 200, i.e., a horizontal rotation state of the head portion 100, and applies relevant information to the microcomputer.

A horizontal rotation method will be described in detail.

A horizontal rotation gear 341 that is fastened to be engaged with the horizontal rotation motor 342 rotates. When the horizontal rotation gear 341 rotates, the neck housing 210 connected thereto is rotated horizontally. By rotation of the neck housing 210, the entire neck portion 200 connected to the entire head portion 100 by the head frame 220 is rotated horizontally. That is, while the body portion 300 is fixed, only the neck portion 200 and the head portion 100 are rotated horizontally.

When the neck portion 200 and the head portion 100 are rotated horizontally, the neck horizontal rotation guide portion 335 contacts the plurality of rails 336 and is rotated horizontally so that smooth rotation may be performed without abrasion of the neck portion 200 and the body portion 300.

When the neck portion 200 and the head portion 100 are rotated horizontally, the neck portion 200 and the head portion 100 may be rotated horizontally without a large gap or vibration due to the head vertical rotation guide portion 213 and the neck horizontal rotation guide portion 335 having substantially similar sizes and shapes.

A degree of horizontal rotation of the head portion 100 is checked by the reed switches (not shown) of the body housing 330.

Rails 336

The rails 336 will be described in detail with reference to FIGS. 10 to 13.

The plurality of rails 336 are located on the neck horizontal rotation guide portion 335. The rails 336 protrude upward from the neck horizontal rotation guide portion 335 and assists smooth rotation of the neck portion 200 and the head portion 100. In other words, the neck horizontal rotation guide portion 335 contacts the plurality of rails 336 and is rotated horizontally.

Figure 10:
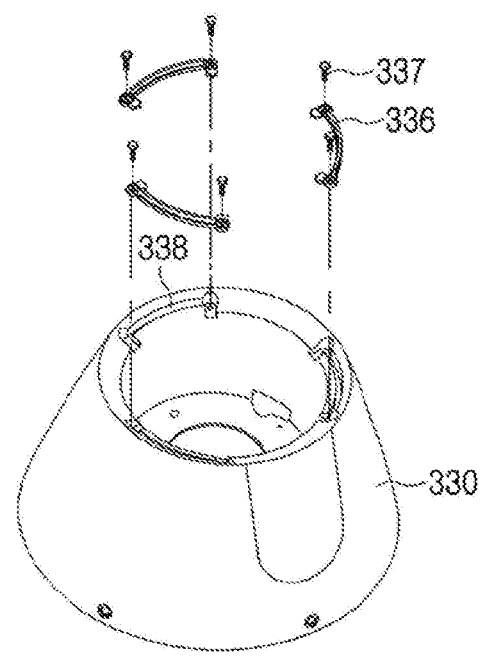
FIG. 10 is an exploded perspective view illustrating the body portion of the air purifier according to an embodiment.

As shown in FIG. 10, rail insertion grooves 338 are located in the neck horizontal rotation guide portion 335, and the rails 336 are combined with the rail insertion grooves 338 of the neck horizontal rotation guide portion 335 by a fixing screw 337.

When the head portion 100 has a spherical shape and thus the neck horizontal rotation guide portion 335 and the head vertical rotation guide portion 213 have a circular shape, the rails 336 have an arc shape. In this case, the neck horizontal rotation guide portion 335 and the head vertical rotation guide portion 213 are also tapered radially inward, and the plurality of rails 336 are tapered radially inward and thus are combined with the neck horizontal rotation guide portion 335.

Also, in this case, if the sum of the lengths of the plurality of rails 336 is configured to be half or more of the radial length of the neck horizontal rotation guide portion 335, the load of the neck portion 200 may be appropriately distributed, and abrasion of the rails 336 may be effectively reduced, and smooth horizontal rotation of the head portion 100 and the neck portion 200 may be implemented.

Figure 11:
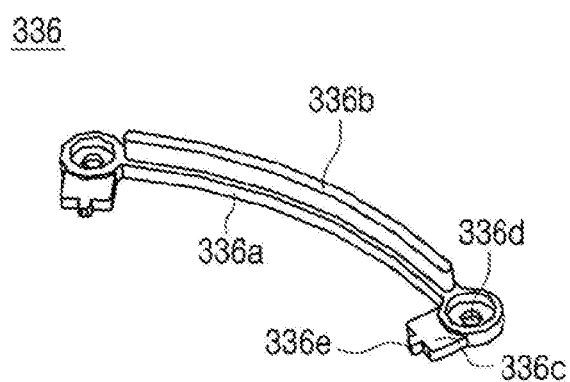
FIG. 11 is a perspective view illustrating a rail of the air purifier according to an embodiment.
Figure 12:
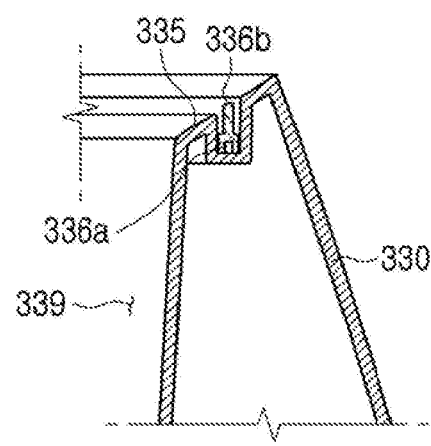
FIGS. 12 and 13 are cross-sectional views illustrating a state in which the rail is combined with the body portion of the air purifier according to an embodiment, taken along lines A-A and B-B of FIG. 9, respectively.

A detailed structure of the rails 336 will be described with reference to FIG. 11.

Each of the rails 336 includes a seating portion 336a seated on the top surface of each of the rail insertion grooves 338, upper ribs 336b located at the upper side of the seating portion 336a and each having a height protruding from the neck horizontal rotation guide portion 335, combination portions 336c located at both ends of the seating portion 336a, screw insertion grooves 336d, which are located at each of the combination portions 336c and into which the fixing screw 337 is inserted to fix the rails 336, and inner ribs 336e that protrude radially inward from each of the combination portions 336c.

Figure 13:
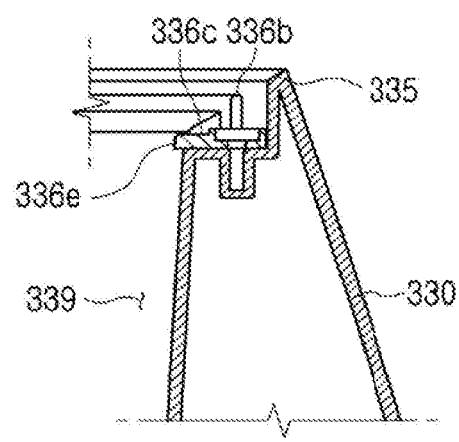

The upper ribs 336b protrude upward from the neck horizontal rotation guide portion 335 (see FIG. 12), and the inner ribs 336e protrude to the inside of the body housing 330 (see FIG. 13).

Thus, the head vertical rotation guide portion 213 is spaced upward from the body housing 330 as much as the upper ribs 336b protrude, and is rotatable, and the neck housing 210 is spaced inward from the body housing 330 as much as the inner ribs 336e protrude.

With this configuration, when the neck portion 200 is rotated horizontally within the body housing 330 by using the rails 336 of a single design, abrasion is suppressed in all directions and smooth rotation is implemented.

According to the related art, when, in an air purifier with a head portion and a body portion separated, vertical rotation and horizontal rotation are simultaneously performed, rotation of one of two is affected by rotation of the other one. However, the present invention has solved the above-described problems in various manners.

Only a neck portion is rotated during horizontal rotation, and the head portion is seated on the neck portion by combination of a head frame and a frame body, and the position of the head portion is not changed.

The head portion is rotated while the neck portion itself is fixed during vertical rotation, and a variety of guide elements (a horizontal rotation support portion, various types of rollers) are provided so that only the head portion seated on the fixed neck portion can be naturally rotated.

The vertical rotation member is located inside the neck portion. Thus, during horizontal rotation, the vertical rotation member included in the neck portion is rotated together with the neck portion so that horizontal rotation and vertical rotation can be independently and simultaneously performed without mutual influence.

Rails are adopted on the body portion so that, when the neck portion is rotated horizontally, abrasion of the neck housing can be suppressed, and smooth rotation can be induced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. An air purifier comprising:
a body portion:
a neck portion located at an upper part of the body portion and combined with the body portion to be rotatable horizontally with respect to the body portion; and
a head portion, which is located at an upper part of the neck portion,
wherein part of the neck portion is combined with an inner side of the head portion so that the head portion is rotatable vertically with respect to the neck portion,
wherein the head portion comprises a fan assembly and filters and discharges inhaled air,
wherein the neck portion comprises:
a neck housing;
a head frame located inside the head portion and being part combined with an inside of the head portion; and
a frame body located inside the neck housing,
wherein the head portion further comprises a head lower housing which constitutes a lower outer surface of the head portion and in which a guide opening is located,
wherein the head frame passes through the guide opening and is combined with the frame body,
wherein frame body insertion members that protrude downward and are inserted into the frame body are located at one side of the head frame, and wherein the frame body insertion members pass through the guide opening.

2. The air purifier of claim 1, wherein vertical rotation of the head portion is limited by a length of the guide opening by the frame body insertion members.

3. The air purifier of claim 1, wherein an opposite part of the frame body insertion members of the head frame is a curved surface.

4. The air purifier of claim 1, wherein the neck portion further comprises a vertical rotation member, the frame body comprises a gear penetration portion, and the vertical rotation member passes through the gear penetration portion and is fastened to the head lower housing.

5. The air purifier of claim 4, wherein, when the vertical rotation member operates, in a state in which the head frame is fixed, the head lower housing and the fan assembly combined therewith are rotated vertically.

6. The air purifier of claim 1, wherein the neck housing further comprises:
a head vertical rotation guide portion extending radially outward from an upper end thereof; and
a vertical rotation support portion extending upward from part of the head vertical rotation guide portion.

7. The air purifier of claim 6, wherein the head portion has a spherical shape, and a curvature of the vertical rotation support portion is the same as a curvature of part of the head portion corresponding to the vertical rotation support portion.

8. The air purifier of claim 6, wherein the vertical rotation support portion is located to cover the guide opening with respect to the outside.

9. The air purifier of claim 6, wherein a roller is located at an upper inner end of the vertical rotation support portion and assists vertical rotation of the head portion.

10. The air purifier of claim 1, wherein a plurality of rollers are located above the frame body, protrude from an upper surface of the frame body, and contact the head lower housing.

11. The air purifier of claim 1, wherein the head portion has a spherical shape, and a curvature of the upper surface of the frame body is the same as a curvature of part of the head portion corresponding to the head lower housing.

12. The air purifier of claim 1, wherein the body portion comprises:
a body housing on which the neck housing is seated; and
an inner body fixed to an inside of the body housing.

13. The air purifier of claim 12, wherein the neck housing is seated on the body housing to be rotatable horizontally.

14. The air purifier of claim 13, wherein a horizontal rotation gear is combined with the neck housing, and the body portion further comprises a horizontal rotation motor combined with the inner body to provide power fastened to the horizontal rotation gear.

15. The air purifier of claim 12, wherein the neck housing comprises a head vertical rotation guide portion extending radially outward from an upper end thereof, and the body housing comprises a neck horizontal rotation guide portion located radially at an upper end thereof, and the head vertical rotation guide portion is seated on the neck horizontal rotation guide portion.

16. The air purifier of claim 15, wherein the neck horizontal rotation guide portion and the head vertical rotation guide portion are tapered radially inward.

17. The air purifier of claim 12, wherein a base is located at a bottom end of the body portion, the inner body is combined with the base, and a plurality of wheels are located on a bottom surface of the base.

18. The air purifier of claim 1, wherein, when the head portion is rotated vertically, the head portion is rotated up and down, and the neck portion and the body portion are fixed, and when the head portion is rotated horizontally, the head portion and the neck portion are rotated left and right, and the body portion is fixed.

* * * * *